(12) United States Patent
Keller et al.

(10) Patent No.: US 11,256,561 B1
(45) Date of Patent: Feb. 22, 2022

(54) COMPUTER PROGRAM CRASH HANDLING (71) Applicant: Smart Information Flow Technologies, LLC, Minneapolis, MN (US)

(72) Inventors: Peter Kelly Keller, Lilydale, MN (US); David John Musliner, Plymouth, MN (US)

(73) Assignee: Smart Information Flow Technologies, LLC, Minneapolis, MN (US)

( * ) Notice: Subject to any disclaimer, the term of this patent is extended or adjusted under 35 U.S.C. 154(b) by 0 days.

(21) Appl. No.: 17/249,532

(22) Filed: Mar. 4, 2021

(51) Int. Cl.
*G06F 11/00* (2006.01)
*G06F 11/07* (2006.01)
*G06F 12/06* (2006.01)

(52) U.S. Cl.
CPC ........ *G06F 11/079* (2013.01); *G06F 11/0751* (2013.01); *G06F 12/0684* (2013.01); *G06F 2212/1032* (2013.01)

(58) Field of Classification Search
CPC .............. G06F 11/079; G06F 11/0751; G06F 12/0684; G06F 2212/1032
USPC ...................................... 714/1–57
See application file for complete search history.

(56) References Cited

U.S. PATENT DOCUMENTS

| | | | |
|---|---|---|---|
| 7,631,249 B2 | 12/2009 | Borde et al. | |
| 8,510,596 B1 | 8/2013 | Gupta et al. | |
| 8,677,189 B2 | 3/2014 | Das | |
| 9,026,866 B2 | 5/2015 | Balasubramanian | |
| 2006/0101401 A1* | 5/2006 | Brumme | G06F 11/1482 717/124 |
| 2007/0006170 A1* | 1/2007 | Hasse | G06F 11/366 717/131 |
| 2008/0195890 A1* | 8/2008 | Earhart | G06F 3/0676 714/6.23 |
| 2011/0289586 A1* | 11/2011 | Kc | G06F 21/566 726/24 |
| 2013/0046952 A1* | 2/2013 | Bates | G06F 12/0238 711/172 |
| 2013/0232137 A1* | 9/2013 | Knott | H04L 63/1416 707/722 |

(Continued)

FOREIGN PATENT DOCUMENTS

CN 103116532 A 5/2013

*Primary Examiner* — Sarai E Butler
(74) *Attorney, Agent, or Firm* — MacFarlane, P.C.

(57) ABSTRACT

A computer detects a crash of a computer program, the crash being caused by a faulting instruction. The computer determines, within concrete stack frame(s) of the computer program, memory position(s) and extent(s) of input. The computer maps, using the memory position(s) and the extent(s), inferred stack frame(s) onto concrete stack frame(s), the inferred stack frame(s) indicating positions of variables used in the computer program. The computer identifies, based on mapping the inferred stack frame(s) onto the concrete stack frame(s), at least one variable from among the variables that is within a stack overflow memory and within a dataflow path to the faulting instruction, wherein the dataflow path to the faulting instruction indicates the variables used in the computer program that are accessed by or contribute to the faulting instruction. The computer determines whether the stack overflow contributed to the crash of the computer program.

19 Claims, 5 Drawing Sheets

(56) References Cited

U.S. PATENT DOCUMENTS

2020/0371945 A1\* 11/2020 Peles ................... G06F 21/6218
2021/0132924 A1\* 5/2021 Kim ......................... G06F 8/53

\* cited by examiner

```
Stack Frame 1
+----------------------+
| void* return_address |
+----------------------+
| void* frame_pointer  |
+----------------------+
| int a                |
+----------------------+
| char b               |
+----------------------+
| int c                |
+----------------------+
```

FIG. 4

```
     Stack Frame 2
     +----------------------+
17   | void* return_address |
     +----------------------+
9    | void* frame_pointer  |
     +----------------------+
5    | int a                |
     +----------------------+
4    | char b               |
     +----------------------+
0    | int c                |
     +----------------------+
```

FIG. 5

```
     Example Inferred Stack Frame 1
         +----------------+
    8    | return_address |
         +----------------+
    0    | frame_pointer  |
         +----------------+
   -4    | var0           |
         +----------------+
   -8    | var1           |
         +----------------+
   -9    | var2           |
         +----------------+
  -10    |    padding     |
         |    -------     |
  -16    |                |
         +----------------+
  -20    | var3           |
         +----------------+
```

FIG. 6

COMPUTER PROGRAM CRASH HANDLING

TECHNICAL FIELD

Embodiments of the present disclosure relate generally to the field of computer science, and more particularly to computer program crash handling.

BACKGROUND

Debugging of crashed computer programs is a challenge in the field of computer science. A computer program may crash due to a stack overflow. Identifying whether a stack overflow caused the crash of the computer program may be desirable.

SUMMARY

Some embodiments relate to a computer-implemented method for identifying whether a crash of a computer program was caused by a stack overflow. The method includes detecting, at a computer executing the computer program, the crash of the computer program, the crash being caused by a faulting instruction in the computer program. The method includes determining, within one or more concrete stack frames of the computer program, one or more memory positions and one or more extents of input to the computer program. The method includes mapping, using the one or more memory positions and the one or more extents, one or more inferred stack frames onto one or more concrete stack frames, the one or more inferred stack frames indicating positions of variables used in the computer program. The method includes identifying, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction. The method includes determining, in response to identifying the at least one variable that is within the stack overflow memory and within the dataflow path to the faulting instruction, that the stack overflow contributed to the crash of the computer program. The method includes providing an output classifying severity, likelihood or manner of contribution of the stack overflow to the crash of the computer program.

Some aspects include a machine-readable medium storing instructions to perform the above method. Some aspects include a system comprising processing circuitry and memory, the memory storing instructions which, when executed by the processing circuitry, cause the processing circuitry to perform the above method. Some aspects include an apparatus comprising means for performing the above method.

The above summary is not intended to describe each illustrated embodiment or every implementation of the subject matter hereof. The figures and the detailed description that follow more particularly exemplify various embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
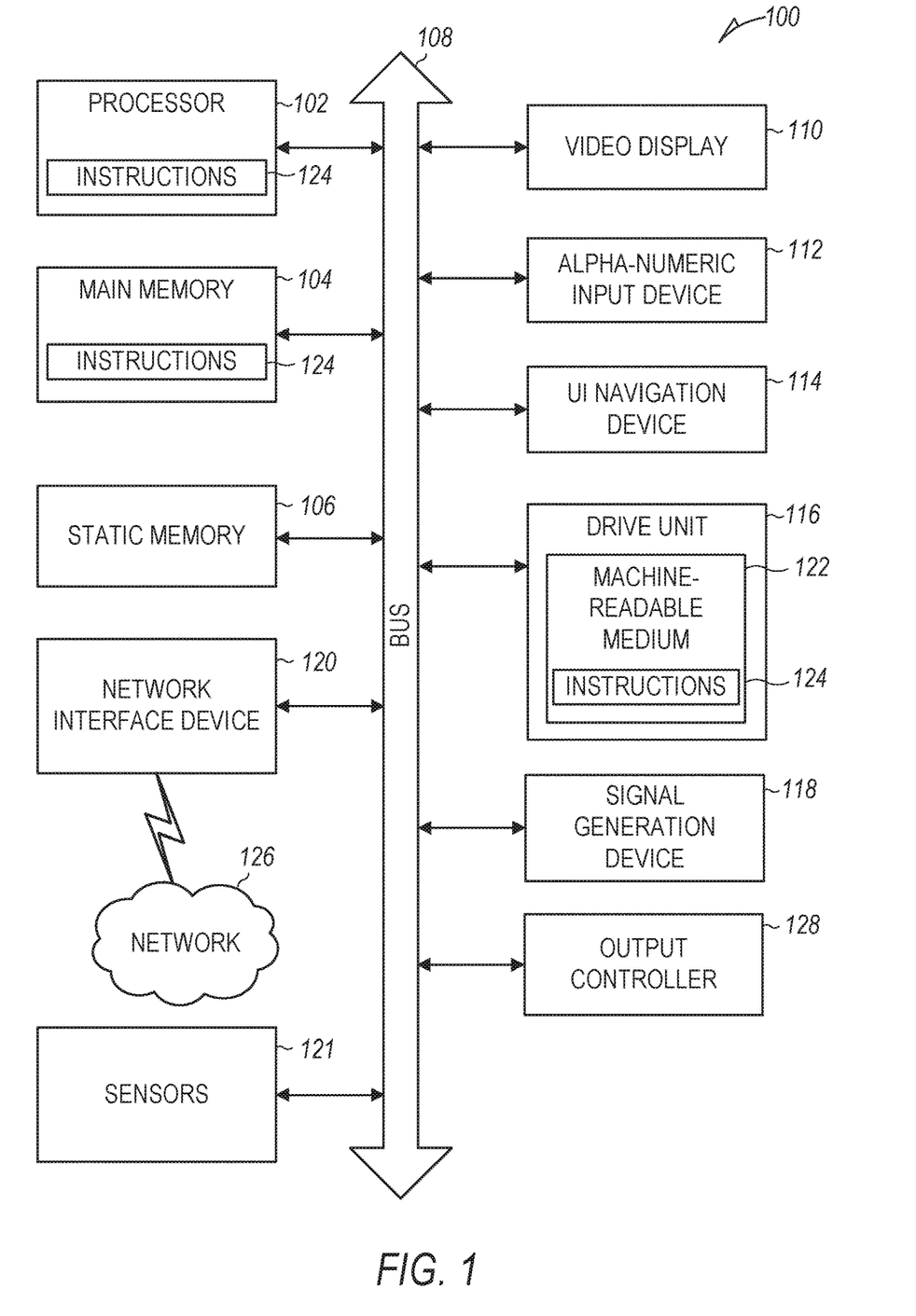
FIG. 1 is a block diagram of a computing machine, according to some embodiments.

FIG. 1 illustrates a circuit block diagram of a computing machine 100 in accordance with some embodiments. In some embodiments, components of the computing machine 100 may store or be integrated into other components shown in the circuit block diagram of FIG. 1. For example, portions of the computing machine 100 may reside in the processor 102 and may be referred to as "processing circuitry." Processing circuitry may include processing hardware, for example, one or more central processing units (CPUs), one or more graphics processing units (GPUs), and the like. In alternative embodiments, the computing machine 100 may operate as a standalone device or may be connected (e.g., networked) to other computers. In a networked deployment, the computing machine 100 may operate in the capacity of a server, a client, or both in server-client network environments. In an example, the computing machine 100 may act as a peer machine in peer-to-peer (P2P) (or other distributed) network environment. In this document, the phrases P2P, device-to-device (D2D) and sidelink may be used interchangeably. The computing machine 100 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 100 may include a hardware processor 102 (e.g., a central processing unit (CPU), a GPU, a hardware processor core, or any combination thereof), a main memory 104 and a static memory 106, some or all of which may communicate with each other via an interlink (e.g., bus) 108. Although not shown, the main memory 104 may contain any or all of removable storage and non-removable storage, volatile memory or non-volatile memory. The computing machine 100 may further include a video display unit 110 (or other display unit), an alphanumeric input device 112 (e.g., a keyboard), and a user interface (UI) navigation device 114 (e.g., a mouse). In an example, the display unit 110, input device 112 and UI navigation device 114 may be a touch screen display. The computing machine 100 may additionally include a storage device (e.g., drive unit) 116, a signal generation device 118 (e.g., a speaker), a network interface device 120, and one or more sensors 121, such as a global positioning system (GPS) sensor, compass, accelerometer, or other sensor. The computing machine 100 may include an output controller 128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 116 (e.g., a storage device) may include a machine readable medium 122 on which is stored one or more sets of data structures or instructions 124 (e.g., software) embodying or utilized by any one or more of the techniques or functions described herein. The instructions 124 may also reside, completely or at least partially, within the main memory 104, within static memory 106, or within the hardware processor 102 during execution thereof by the computing machine 100. In an example, one or any combination of the hardware processor 102, the main memory 104, the static memory 106, or the storage device 116 may constitute machine readable media.

While the machine readable medium 122 is illustrated as a single medium, the term "machine readable medium" may include a single medium or multiple media (e.g., a centralized or distributed database, and/or associated caches and servers) configured to store the one or more instructions 124.

The term "machine readable medium" may include any medium that is capable of storing, encoding, or carrying instructions for execution by the computing machine 100 and that cause the computing machine 100 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 124 may further be transmitted or received over a communications network 126 using a transmission medium via the network interface device 120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (WEE) 802.11 family of standards known as Wi-Fi®, IEEE 802.16 family of standards known as WiMax®), IEEE 802.15.4 family of standards, a Long Term in Evolution (LTE) family of standards, a Universal Mobile Telecommunications System (UMTS) family of standards, peer-to-peer (P2P) networks, among others. In an example, the network interface device 120 may include one or more physical jacks (e.g., Ethernet, coaxial, or phone jacks) or one or more antennas to connect to the communications network 126.

Some embodiments relate to a computer-implemented technique for identifying whether a crash of a computer program was caused by a stack overflow. A computer executing a computer program detects the crash of the computer program. The crash is caused by a faulting instruction in the computer program. The computer determines, within its memory corresponding to the executing program, which include the concrete stack frames representing the program's state, one or more concrete stack frames of the computer program, one or more memory positions and one or more extents of input to the computer program. The computer maps, using the one or more memory positions and the one or more extents, one or more inferred stack frames onto one or more concrete stack frames. The one or more inferred stack frames indicate positions of variables used in the computer program. The computer identifies, based on mapping the one or more inferred stack frames onto the one or more concrete stack frames, at least one variable, whose provenance is from the user's code or injected by the compiler, from among the variables used in the computer program, that is within a stack overflow memory and possibly within a dataflow path to the faulting instruction. The dataflow path to the faulting instruction indicates the variables used in the computer program that are accessed by or contribute to the faulting instruction. The computer determines, in response to identifying the at least one variable that is within the stack overflow memory and within the dataflow path to the faulting instruction, that the stack overflow contributed to the crash of the computer program. The computer provides an output classifying severity, likelihood or manner of contribution of the stack overflow to the crash of the computer program. This technique may be embodied within a debugger of the computer program, which provides the output. Non-limiting examples of the terms "extent," "concrete stack frame," and "inferred stack frame" are provided below.

As used herein, an extent may include, among other things, a contiguous area of memory (either symbolic or concrete), described by a starting and ending address, denoting where in memory a piece of knowledge is stored and/or symbolically labeled. The extent may include the range of a contiguous memory region and its contents. An extent may fully contain, intersect with, or be disjoint from, other extents. Examples of extents include: (i) the start/end of input data in the stack memory segment; (ii) the start/end of a single stack frame; (iii) the start/end of a single variable contained within a stack frame, where start/end refers to a memory region starting a starting address and ending at an ending address. The contents of an extent, when in an actual program's memory, are, according to some embodiments, 8-bit unsigned values. Within a symbolic piece of memory, the contents are, according to some embodiments, semantic labels.

As used herein, a concrete stack frame may include, among other things, an extent in real memory for an executing computer program which is used as the storage space for the whole of an executing function's stack frame. A concrete stack frame may contain the explicit variable locations which are enforced by instruction access patterns and contain actual values needed by that function at its time of execution. There may be additional unused padding space for variable alignment purposes or other variables added beyond the original symbolic stack frame definition by the compiler to help the function execute. Variables may also have been re-arranged in their relation to each other with respect to the original symbolic stack frame.

As used herein, an inferred stack frame may include, among other things, a heuristically reconstructed symbolic stack frame for a computer program using the instructions of that function and their memory access patterns as a guide to the locations of the variables and their sizes within that frame.

Some embodiments include determining whether an extent is contained in, intersects, or does not intersect another extent (plus, in some cases, other operations) and then assign meaning to the result.

In one embodiment, the computing machine discovers, in a crashed computer program, that the input data of "Hello from Greenland." is in the stack memory segment from address 0xbfffe0a0 to address 0xbffe0b5. In this case, the extent is:
A: {start: 0xbfffe0a0, end: 0xbffe0b5, data: "Hello from Greenland."}

Another extent may represent an entire concrete stack frame in that same program:
B: {start: 0xbfffe080, end: 0xbffe0b0, data: <binary contents of stack frame>}

Given this, some embodiments perform various set theory operations on A and B's contiguous ranges and assign results to the answer. For example, the computing machine may determine that B intersects A (both in range and also contents) but B is not contained fully within A. Hence, B overruns A's valid range.

Some embodiments may perform other functionalities in addition to or in place of range comparison. For example, some embodiments compare the contents of A with what is actually presented as input to the computer program to see how closely they match. For instance, even though A contains "Hello from Greenland." which is a 100% match with what was presented to the computer program, it could have been 90% of a match against the presented input instead.

Another situation where extents may be used is when the extent of a stack variable intersects the extent of a buffer overwrite and that stack variable is also used in the data flow to the faulting instruction. In this case, the contents of the buffer overflow can control how that instruction executes.

As used herein, a symbolic stack frame includes, among other things, a labeling and assignment of the storage space for each variable. The symbolic stack frame may be passed in arguments, beyond those which fit into registers, that are local to a function. The symbolic stack frame may be defined directly by the original source code of the program.

An example computer program in C is presented in Computer Program 1.
Computer Program 1
int foo(int val)
{
int a=10;
char b=34;
int c=20;
bar( );
return val+a+b+c;
}

Figure 4:
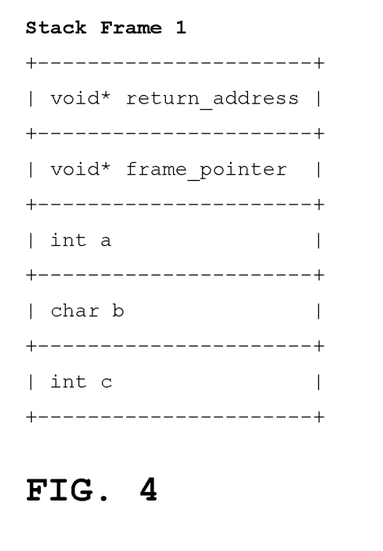
FIG. 4 illustrates a first stack frame, according to some embodiments.

As shown in FIG. 4, the stack frame for Computer Program 1 is represented in Stack Frame 1 as a symbolic stack frame in the compiler that pictorially looks like Stack Frame 1, where the compiler added two more variables it needs to help execute Computer Program 1.

Figure 5:
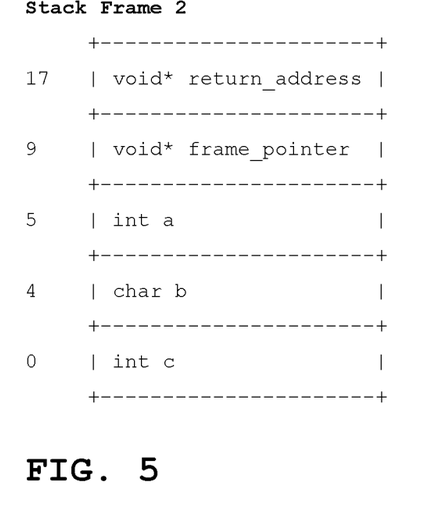
FIG. 5 illustrates a second stack frame, according to some embodiments.

The type size in bytes is as follows: void*=8; int=4; char=1. By giving the start of the symbolic frame an address of zero at the bottom, some embodiments complete describing the symbolic stack frame as shown in Stack Frame 2, illustrated in FIG. 5, where the numbers indicate the starting memory location of each variable. Some embodiments may store more information about the function's local state; these are not illustrated here for simplicity. As illustrated in FIG. 5, the variables are contiguous in the virtual memory address space.

As shown, the virtual address of variable 'b' with respect to this stack frame is at 4, and the return_address is at 17. Each function's symbolic stack frame is in its own virtual address space in the compiler.

Through the process of compilation, the source code of Computer Program 1 (and symbolic stack frame layout) is converted into binary code which disassembles to this assembly. According to some embodiments, the symbolic stack frame layout goes through additional changes that can move variables around in it, add padding space to align variable accesses, and the like.

Example Final Stack Frame Encoded by Actual Instructions

| | | | |
|---|---|---|---|
| b: | f3 0f 1e fa | endbr64 | |
| f: | 55 | push | %rbp |
| 10: | 48 69 e5 | mov | %rsp,%rbp |
| 13: | 48 83 ec 18 | sub | $0x18,%rsp |
| 17: | 89 7d ec | mov | %edi,-0x14(%rbp) |
| 1a: | c7 45 f8 0a 00 00 00 | movl | $0xa,-0x8(%rbp) |
| 21: | c6 45 f7 22 | movb | $0x22,-0x9(%rbp) |
| 25: | c7 45 fc 14 00 00 00 | movl | $0x14,-0x4(%rbp) |
| 2c: | e8 00 00 00 00 | callq | 31 <foo+0x26> |
| 31: | 8b 55 ec | mov | -0x14(%rbp),%edx |
| 34: | 8b 45 f8 | mov | -0x8(%rbp),%eax |
| 37: | 01 c2 | add | %eax,%edx |
| 39: | 0f be 45 f7 | movsbl | -0x9(%rbp),%eax |
| 3d: | 01 c2 | add | %eax,%edx |
| 3f: | 8b 45 fc | mov | -0x4(%rbp),%eax |
| 42: | 01 d0 | add | %edx,%eax |
| 44: | c9 | leaveq | |
| 45: | c3 | retq | |

As illustrated, the instructions explicitly access variable locations in the stack segment that match up to the final layout of the symbolic stack frame in memory. The illustrated example final stack frame variable layout, combined with data in memory associated with the real execution of the program, leads to a concrete stack frame.

In some embodiments, it is the case that the technique which infers a stack frame is a heuristic. The compiler could have leveraged optimization schemes that may be hard to reason about and invert back into the original symbolic stack frame layout. Also, if some embodiments are working from a stripped binary (no debugging information) and do not have the original source code, the computing machine might not be able to recover the names of the symbolic variables, so instead some embodiments generate names for them.

Figure 6:
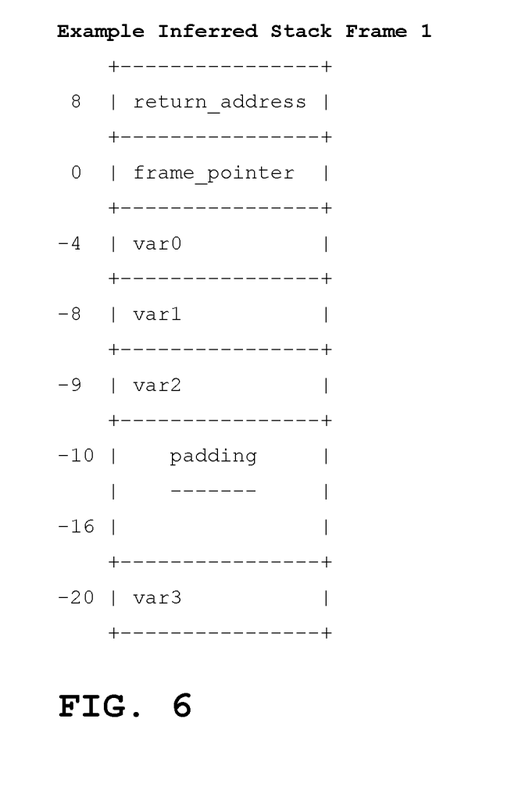
FIG. 6 illustrates an example inferred stack frame, according to some embodiments.

Example inferred stack frame 1 is shown in FIG. 6. As illustrated, some embodiments set the virtual address origin of the inferred stack frame to the location of the frame_pointer. As shown in FIG. 6, the frame_jointer and return_address are in the boiler plate generated by the compiler so they are easy to pick back out.

In example inferred stack frame 1, var0 is variable c, var1 is variable a, var2 is variable b, padding is for variable alignment purposes, var3 is a new stack frame variable the compiler inserted into the frame to help compute the function's result. It is not in the original symbolic stack frame. As shown, the inferred stack frame is slightly different that the original symbolic stack frame but still contains the original symbolic variables, just rearranged.

In some embodiments, when a computer program crashes, the computing machine looks up the function's implementation to which the crashing instruction belongs and the function's node in the previously computed control flow graph. From that, some embodiments get the previously computed inferred stack frame for that function. Then, some embodiments inspect the crashed computer program's memory to find where in memory the concrete stack frame resides for the function whose instruction had erred. Some embodiments check to see that the return address of the concrete stack frame matches the possible return addresses indicated by that function's control flow graph node.

If the return address matches, then some embodiments align the inferred stack frame's virtual address space over the concrete stack frame in the program's real address space such that the 0 address in the inferred stack frame is at the actual frame pointer address in the real memory. This gives the computer a map of the variables in the otherwise binary blob of the concrete stack frame. At this point, some embodiments now can transitively label the actual variable extents in the concrete stack frame with the generated symbolic names from the inferred stack frame's variable extents.

Then some embodiments can tell how many variables were affected by the buffer overflow and how they are used in the function itself with the ultimate goal of identifying exploitability of that overflow in otherwise difficult to reason about situations. An example of a difficult to reason about situation is when a buffer overflow destroys local variables in a concrete stack frame, but doesn't extend into the compiler generated runtime boilerplate that includes stack canary variables, and there is no source code or any debugging information available for the computer program executable under debugging. In some cases, this may be a difficult type of stack buffer overflow to find and what some embodiments of the techniques disclosed herein are designed to analyze.

As used herein, a dataflow graph is a directed graph data structure that represents the flow of data and its dependencies across a sequence of operations. In some embodiments, the data itself may be symbolic (e.g., a variable name) or concrete (e.g., a specific memory cell or computer register of an executing program), or both. The operations can be, for example, any operation that reads, writes, mutates, or combines that data with any other data. In some embodiments, the dataflow graph may be annotated with provenance information describing the memory segments from which the data variables originated, or other pertinent information. There are a wide variety of dataflow graph types and granularity. One embodiment of the dataflow graph in this method tracks data movement in CPU registers and memory locations across CPU operations. From the dataflow graph, one technique can identify the memory provenance of data used by the faulting instructions to determine if a stack corruption has corrupted that memory.

Figure 2:
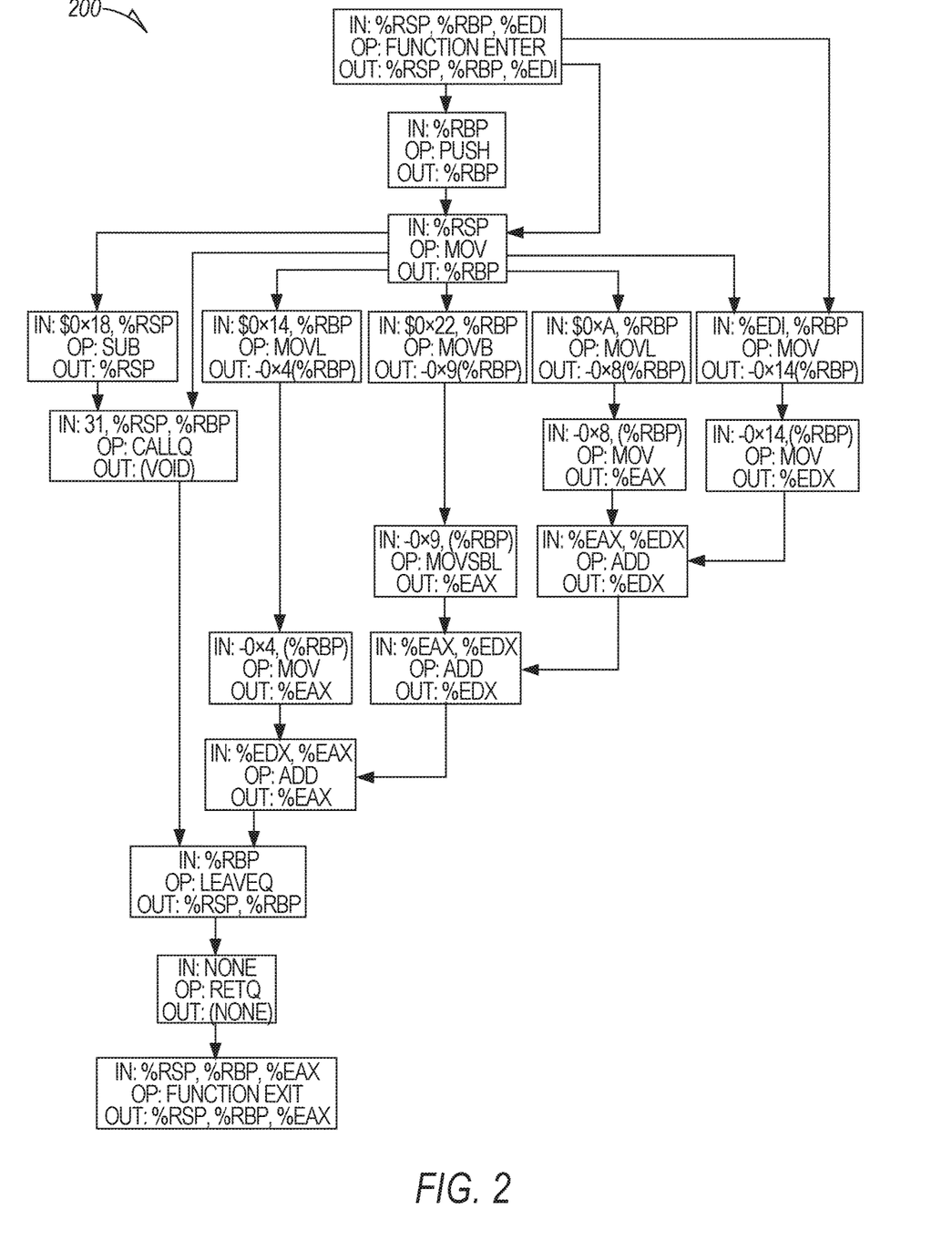
FIG. 2 is an example dataflow graph for assembly instructions of an example computer program, according to some embodiments.

FIG. 2 is an example dataflow graph 200 for assembly instructions of an example computer program, according to some embodiments. FIG. 2 illustrates the dataflow graph 200 for the assembly instructions of Computer Program 1.

Figure 3:
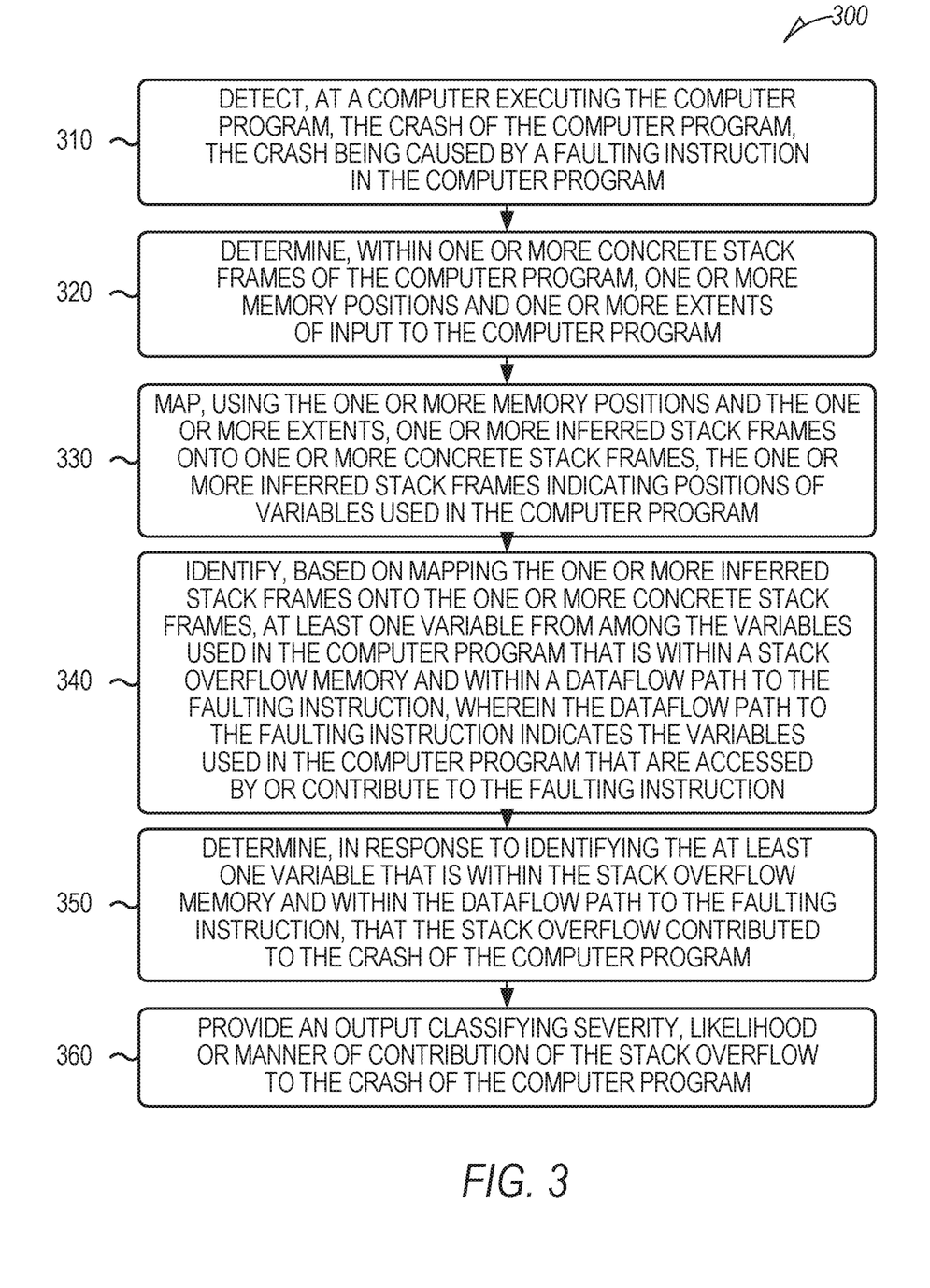
FIG. 3 is a flow chart of a method for computer program crash handling, according to some embodiments.

FIG. 3 is a flowchart of an example process 300 associated with computer program crash handling. In some implementations, one or more process blocks of FIG. 3 may be performed by a computer (e.g., computing machine 100 of FIG. 1). In some implementations, one or more process blocks of FIG. 3 may be performed by another device or a group of devices separate from or including the computer. Additionally, or alternatively, one or more process blocks of FIG. 3 may be performed by one or more components of the computing machine 100, such as processor 102, main memory 104, static memory 106, drive unit 116, and/or output controller 128.

As shown in FIG. 3, process 300 may include detecting, at a computer executing the computer program, the crash of the computer program, the crash being caused by a faulting instruction in the computer program (block 310). For example, the computer executing the computer program may detect the crash of the computer program, the crash being caused by a faulting instruction in the computer program, as described above.

As further shown in FIG. 3, process 300 may include determining, within one or more concrete stack frames of the computer program, one or more memory positions and one or more extents of input to the computer program (block 320). For example, the computer may determine, within one or more concrete stack frames of the computer program, one or more memory positions and one or more extents of input to the computer program, as described above.

As further shown in FIG. 3, process 300 may include mapping, using the one or more memory positions and the one or more extents, one or more inferred stack frames onto one or more concrete stack frames, the one or more inferred stack frames indicating positions of variables used in the computer program (block 330). For example, the computer may map, using the one or more memory positions and the one or more extents, one or more inferred stack frames onto one or more concrete stack frames, the one or more inferred stack frames indicating positions of variables used in the computer program, as described above.

As further shown in FIG. 3, process 300 may include identifying, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction (block 340). For example, the computer may identify, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction, as described above.

As further shown in FIG. 3, process 300 may include determining, in response to identifying the at least one variable that is within the stack overflow memory and within the dataflow path to the faulting instruction, that the stack overflow contributed to the crash of the computer program (block 350). For example, the computer may determine, in response to identifying the at least one variable that is within the stack overflow memory and within the dataflow path to the faulting instruction, that the stack overflow contributed to the crash of the computer program, as described above.

As further shown in FIG. 3, process 300, depending upon the context of original fault of the program (whether it was a DivideByZero, SourceAccessViolation, etc.), may include performing constraint analysis on the concrete values found in the inferred stack variables which intersected the dataflow to the faulting instruction and the concrete values found in the Computer Program's registers to compute the concrete values and their provenance that materially caused the fault itself. For example, if the original fault was a DivideByZero and the instruction's divisor register contains zero but the instruction before it added a concrete value retrieved from the extent of an inferred stack variable to that same register, then process 300 may solve for the value of what needs to have been in the concrete stack variable such that adding it to the previous value in that register produced zero. Then process 300 identifies if that specific value existed in the input data at the right location in the input extent. This information is used in the output of process 300.

As further shown in FIG. 3, process 300 may include providing an output classifying severity, likelihood or manner of contribution of the stack overflow to the crash of the computer program (block 360). For example, the computer may provide an output classifying severity, likelihood or manner of contribution of the stack overflow to the crash of the computer program, as described above.

The output of the computer may include two categories of information which are combined together into the final result representing the severity, likelihood or manner of contribution of the stack overflow to the crash. The first category, herein named as BOFCategory, indicates the context (severity, likelihood, manner) of how the input data was found in the stack segment. The second category, herein named as ChainCategory, indicates which inferred stack variables intersect the dataflow to the faulting instruction and how this relates to the extent of the corrupted memory.

According to some implementations, the BOFCategory is itself split into three pieces. The first piece is a set of features that represent the individually discovered features of the (possible) memory corruption. These features are enumerated below. The second piece is a set of extents, and a percentage match score for each extent, which identifies the location(s) of the input data found in the stack segment of the faulted computer program. The third piece identifies any stack frame return addresses located in those extents and if the concrete contents of those return addresses match, surpassing some threshold, with the input data to the computer program at the correct locations in the input data.

Here is an enumeration of the BOFCategory features:

PIS represents that the input data has been found in the stack segment at or better than some percentage threshold of full integrity.

RLP means that any concrete stack frame's location of its return address is found within the extents of the memory corruption.

RNK means that any actual value of the return address as found in the computer program's memory being debugged has been discovered to be not a legal return address.

RIP means that the bytes actually found in a return address location in a concrete stack frame were also found in the input data to the program.

Through set inclusion, these features together form a lattice from the empty set to the set containing all of the features where each named node of the set inclusion lattice differs only by a single feature. In the below enumeration of the set inclusion lattice, any node which represents an impossible situation has a prefix of Error:

Undetectable: { }
Coincidence: {RIP}
VeryUnlikely: {RNK}
Unlikely: {RNK, RIP}
ErrorRLP: {RLP}
ErrorRLPRIP: {RLP, RIP}
ErrorRLPRNK: {RLP, RNK}
ErrorRLPRNKRIP: {RLP, RNK, RIP}
DidNotDamageRetaddr: {PIS}
Suspicious: {PIS, RIP}
Indeterminate: {PIS, RNK}
AlmostTargeted: {PIS, RNK, RIP}
Likely: {PIS, RLP}
Targeted: {PIS, RLP, RIP}
VeryLikely: {PIS, RLP, RNK}
AlmostSurely: {PIS, RLP, RNK, RIP}

According to some embodiments, the severity of the corruption causing measurable and effectual damage in the computer program's memory is measured by which features are present and the cardinality of each set. As shown, the minimum severity is Undetectable and the maximum severity is AlmostSurely. As more and more features are discovered for the set of input extents by the embodiment of this method, the greater the severity and likelihood that an exploitable memory corruption has been found.

In nodes that do contain the PIS feature, but do not contain the RLP feature, such as DidNotDamageRetaddr, a buffer overflow could in fact have corrupted one or more concrete stack variables that represent user variables in the Program, but not any variables representing the stack infrastructure put in place by the compiler. The BOFCategory output alone cannot necessarily indicate this situation.

ChainCategory, the second category, represents additional output information required to determine if concrete stack variables that represent user variables have been corrupted by the memory overflow.

The ChainCategory is split into two parts. The first part is a set of features that indicate the presence, and extents, of inferred stack variables that intersect the input data extents in the Computer Program's memory and if those variables intersect the data flow path from the start of the function to the faulting instruction. The second part relates the original fault in the Computer Program with the stack variables from the first part. We enumerate the feature set of the first part:

AnyStkvarsIntersectedPoV represents that the embodiment of this algorithm identified a set of inferred stack variables whose extent(s) in the Computer Program's executable memory intersects some set of input data extents.

DataflowStkvarIntersectedPoV represents that the embodiment of this algorithm identified that any of the variables identified in the AnyStkvarIntersectedPoV set also intersects with the dataflow path to the faulting instruction.

The second part of the ChainCategory relates the original fault in the computer program with the previous identification of the inferred stack variables and the observed or computed concrete values and their provenance which materially caused the fault. This relation is effectively an enumeration of the combination of the identified information depending on the type of fault. It serves to identify which concrete location representing inferred stack variables were corrupted by the exact concrete values found in the input extents that overflowed into that region of the executable's memory Combined, the BOFCategory and ChainCategory output will together produce the full result of the embodiment.

Process 300 may include additional implementations, such as any single implementation or any combination of implementations described below and/or in connection with one or more other processes described elsewhere herein.

In a first implementation, the one or more extents comprise a contiguous area of memory of the computer denoted by a starting address and an ending address.

In a second implementation, the one or more extents further comprise the data stored in the contiguous area of memory.

In a third implementation, the one or more concrete stack frames comprise an extent in memory of the computer used for executing the computer program and storing a whole of a stack of the computer program.

In a fourth implementation, an inferred stack frame from among the one or more stack frames comprises a heuristically reconstructed symbolic stack frame in the executing computer program.

In a fifth implementation, mapping the one or more inferred stack frames onto the one or more concrete stack frames comprises identifying, in the one or more concrete stack frames, memory positions and extents of variables named in the one or more inferred stack frames.

In a sixth implementation, the output is provided via a debugger of the computer program, the process 300 being performed by the debugger. The output may be provided by the debugger. The process 300 may be embodied in the debugger.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

In some embodiments, the disclosed technique(s) work on stripped binaries with or without stack canary protections and no access to source code. One type of crash implemented for the disclosed technique(s) is when a divide by zero happens after a stack buffer overflow overwrites the variables used in the division, but it could be extended to work in other circumstances.

In some embodiments, the disclosed technique(s) analyze a crashed executable in vivo and, in the right conditions, discover that the crash is a result of a stack overflow with user controlled data whose extent is contained only within the declared variables of the stack frame. Specifically this means that the overflow would have avoided tripping the commonly employed stack integrity method of using a stack canary. Specifically, some embodiments can identify stack variables that contribute directly to the crash.

In some cases, the stack overflows which destroy frame variables but do not extend outside of the frame's local variable extent are difficult to find and diagnose. In some cases, often the computer program can be made to continue in its compromised state potentially allowing other bugs to be exposed.

Some embodiments assume a stripped executable with stack canary protection turned off and no available source code.

In some embodiments, the computer program may be pre-conditioned (e.g., using Pereti, a tool from GrammaTech) to infer four things: the location and extent of all functions in the binary, a function control flow graph, an instruction control flow graph, and a stack layout for each function. The stack layout contains a schema that describes the frame layout, including the return address placement, arguments passed to the function placement, location and sizes of variables allocated on the stack, and gives them symbolic names. The semantic meanings of the local frame variables are not inferred. Some embodiments call one of these stack layouts an "inferred frame."

In some embodiments, the computer program is executed in a debugger and when the computer program crashes (e.g., with a divide by zero error), the computer executing the computer program runs the debugger to perform the analysis of the crash location and memory of the computer program.

In some embodiments, the computer runs an exploitable plugin (e.g., the GDB exploitable plugin) which classifies the bug as to its exploitability severity and also does some convenient bookkeeping for the computer to gather exactly where the bug happened in the instruction stream along with the type of bug—floating point error, memory access error, and the like. In the case of a divide by zero error, the exploitable plugin may classify it as PROBABLY_NOT_EXPLOITABLE. The subsequent steps of the process indicate how this is wrong and it is, in fact, EXPLOITABLE.

In some embodiments, the computer analyzes the computer program stack (e.g., a stack frame of an actual executing program: a "concrete frame") in order to determine if any of the concrete frames have been corrupted by user input and the extent of the corruption. The computer checks to see if input obtained from stdin of the process is written to the stack, and if so where. Some embodiments do this by searching, in a regex-like manner, the input data over the legal concrete stack segment region in memory. When corruption is found, some embodiments produce a detailed classification of the features of the corruption and a detailed map in memory of the extent of the corruption. This bookkeeping data records the faulting concrete stack frame, the non-faulting frames, and other such information about the concrete stack. The computer is aware of induced libc stack frames (aborts, signal handlers, and the like) as well. For example, the computer may store, in memory, information about the induced libc stack frames.

Some embodiments may find suitable information indicating a crash from a buffer overflow on the stack, in this case with a consequence of a divide by zero, the computer continues its analysis.

In some embodiments, the computer looks up the following things from the preconditioning given the address of the crashing instruction: the inferred procedure containing the crashing instruction address, the inferred control-flow graph (CFG) procedure node, the inferred CFG instruction node, the inferred stack frame for this procedure, and information about the faulting instruction (opcode, registers, and the like).

In some embodiments, the computer validates (to the best it can given corrupted concrete stack frames) that the concrete stack frame that the computer believes to be for the inferred procedure actually is for that inferred procedure. The computer does this by inspecting the preconditioning data associated with the inferred CFG procedure node from the above operations and ensuring that the concrete frame's return address is one of the legal return addresses in the CFG node for the procedure.

In some embodiments, the computer finds the concrete memory location of the concrete return address and aligns the inferred frame over the concrete memory. This provides the computer with a labeled window in memory for the inferred local stack variables. The computer collects these variables from the concrete stack frame and calls this set of variables the 'stkvars.'

In some embodiments, the computer then collects any concrete stack variables (and their values) that intersected any concrete memory range of buffer overflowed memory. These variables are local variables that are directly altered by the buffer overflow. These variables may be referred to as "intersected stkvars."

In some embodiments, the computer processes along (e.g., walks up) the predecessor paths of previous instructions in the instruction CFG starting from the faulting instruction until either it finds a MOV (move) instruction from the intersected stkvars to the register of the faulting instruction, or it reaches the entry point of the procedure. The computer's initial technique may be, in some cases, a constraint solver that has looked for a very specific constraint on the registers. This technique is basically following (in reverse) the dataflow of the zero register to how it got to be that way.

Some embodiments could be extended to allow more complex trajectories that require more general constraint solving of memory/register values given the instruction operations found along the trajectory. Some embodiments could be extended to perform interprocedural analysis of the ancestor trajectory to ultimate find the sources for the information participating in the zeroed register.

In some embodiments, the computer checks to see if any of these intersected stkvars are actually zero. In this case, some embodiments may prove that the buffer overflow in fact has a consequence of causing a divide by zero. Therefore, the divide by zero is exploitable.

Some embodiments of the technology are described in conjunction with stack overflow. However, it should be noted that the technology described herein may be extended to other types of post-crash analysis and/or other exploitable vulnerabilities. Some embodiments are related to algorithm(s) that are implemented to look for the input data in the stack segment and deals with buffer overflows and dataflows relating to stack segment located variables. All or a portion of these algorithm(s) are applicable to faults in heap memory caused by buffer overflows. The input data extents can be found in heap memory and the dataflow analysis can be recast without much conceptual difference to look for variables stored in heap memory.

Some embodiments are described below as numbered examples (Example 1, 2, 3 . . . ). These examples are provided as examples only and do not limit the disclosed technology.

Example 1 is a computer-implemented method for identifying whether a crash of a computer program was caused by a stack overflow, the method comprising: detecting, at a computer executing the computer program, the crash of the computer program, the crash being caused by a faulting instruction in the computer program; determining, within one or more concrete stack frames of the computer program, one or more memory positions and one or more extents of input to the computer program; mapping, using the one or more memory positions and the one or more extents, one or more inferred stack frames onto one or more concrete stack frames, the one or more inferred stack frames indicating positions of variables used in the computer program; identifying, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction; determining, in response to identifying the at least one variable that is within the stack overflow memory and within the dataflow path to the faulting instruction, that the stack overflow contributed to the crash of the computer program; and providing an output classifying severity, likelihood or manner of contribution of the stack overflow to the crash of the computer program.

In Example 2, the subject matter of Example 1 includes, wherein the one or more extents comprise a contiguous area of memory of the computer denoted by a starting address and an ending address.

In Example 3, the subject matter of Example 2 includes, wherein the one or more extents further comprise the data stored in the contiguous area of memory.

In Example 4, the subject matter of Examples 1-3 includes, wherein the one or more concrete stack frames comprise an extent in memory of the computer used for executing the computer program and storing a whole of a stack of the computer program.

In Example 5, the subject matter of Examples 1-4 includes, wherein an inferred stack frame from among the one or more stack frames comprises a heuristically reconstructed symbolic stack frame in the executing computer program.

In Example 6, the subject matter of Examples 1-5 includes, wherein mapping the one or more inferred stack frames onto the one or more concrete stack frames comprises identifying, in the one or more concrete stack frames, memory positions and extents of variables named in the one or more inferred stack frames.

In Example 7, the subject matter of Examples 1-6 includes, wherein the output is provided via a debugger of the computer program, the method being performed by the debugger.

Example 8 is at least one machine-readable medium including instructions that, when executed by processing circuitry, cause the processing circuitry to perform operations to implement of any of Examples 1-7.

Example 9 is an apparatus comprising means to implement of any of Examples 1-7.

Example 10 is a system to implement of any of Examples 1-7.

Example 11 is a method to implement of any of Examples 1-7.

Embodiments of the present disclosure provide a number of technical improvements over conventional systems and methods. While the improvements will be apparent to those of skill in the art in view of the various embodiments described, a selection of such improvements is discussed herein.

In one embodiment, the system 100 and/or its components or subsystems can include computing devices, microprocessors, modules and other computer or computing devices, which can be any programmable device that accepts digital data as input, is configured to process the input according to instructions, algorithms or techniques, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computer(s), computing device(s), and other device(s) discussed herein can include memory. Memory can comprise volatile or non-volatile memory as required by the coupled computing device or processor to not only provide space to execute the instructions, algorithms or techniques, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method for identifying whether a crash of a computer program was caused by a stack overflow, the method comprising:
   detecting, at a computer executing the computer program, the crash of the computer program, the crash being caused by a faulting instruction in the computer program;
   determining, within one or more concrete stack frames of the computer program, one or more memory positions and one or more extents of input to the computer program;
   mapping, using the one or more memory positions and the one or more extents, one or more inferred stack frames onto one or more concrete stack frames, the one or more inferred stack frames indicating positions of variables used in the computer program, wherein an inferred stack frame from among the one or more inferred stack frames comprises a heuristically reconstructed symbolic stack frame in the executing computer program;
   identifying, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction;
   determining, in response to identifying the at least one variable that is within the stack overflow memory and within the dataflow path to the faulting instruction, that the stack overflow contributed to the crash of the computer program; and
   providing an output classifying severity, likelihood or manner of contribution of the stack overflow to the crash of the computer program.

2. The method of claim 1, wherein the one or more extents comprise a contiguous area of memory of the computer denoted by a starting address and an ending address.

3. The method of claim 2, wherein the one or more extents further comprise data stored in the contiguous area of memory.

4. The method of claim 1, wherein the one or more concrete stack frames comprise an extent in memory of the computer used for executing the computer program and storing a whole of a stack of the computer program.

5. The method of claim 1, wherein mapping the one or more inferred stack frames onto the one or more concrete stack frames comprises identifying, in the one or more concrete stack frames, memory positions and extents of variables named in the one or more inferred stack frames.

6. The method of claim 1, wherein the output is provided via a debugger of the computer program, the method being performed by the debugger.

7. The method of claim 1, wherein the computer is executing the computer program with stack canary protection turned off.

8. The method of claim 1, further comprising:
   determining that the input to the computer program contributed to the stack overflow that contributed to the crash of the computer program.

9. A system for identifying whether a crash of a computer program was caused by a stack overflow, the system comprising:
   processing circuitry; and
   a memory storing instructions which, when executed by the processing circuitry, cause the processing circuitry to perform operations comprising:

detecting, at the processing circuitry executing the computer program, the crash of the computer program, the crash being caused by a faulting instruction in the computer program;

determining, within one or more concrete stack frames of the computer program, one or more memory positions and one or more extents of input to the computer program;

mapping, using the one or more memory positions and the one or more extents, one or more inferred stack frames onto one or more concrete stack frames, the one or more inferred stack frames indicating positions of variables used in the computer program, wherein an inferred stack frame from among the one or more inferred stack frames comprises a heuristically reconstructed symbolic stack frame in the executing computer program;

identifying, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction;

determining, in response to identifying the at least one variable that is within the stack overflow memory and within the dataflow path to the faulting instruction, that the stack overflow contributed to the crash of the computer program; and providing an output classifying severity, likelihood or manner of contribution of the stack overflow to the crash of the computer program.

10. The system of claim 9, wherein the one or more extents comprise a contiguous area of memory of the computer denoted by a starting address and an ending address.

11. The system of claim 10, wherein the one or more extents further comprise data stored in the contiguous area of memory.

12. The system of claim 9, wherein the one or more concrete stack frames comprise an extent in memory of the computer used for executing the computer program and storing a whole of a stack of the computer program.

13. The system of claim 9, wherein mapping the one or more inferred stack frames onto the one or more concrete stack frames comprises identifying, in the one or more concrete stack frames, memory positions and extents of variables named in the one or more inferred stack frames.

14. The system of claim 9, wherein the output is provided via a debugger of the computer program, the operations being performed by the debugger executing on the processing circuitry.

15. A non-transitory computer-readable medium storing instructions to perform operations for identifying whether a crash of a computer program was caused by a stack overflow, the operations comprising:

detecting, at a computer executing the computer program, the crash of the computer program, the crash being caused by a faulting instruction in the computer program;

determining, within one or more concrete stack frames of the computer program, one or more memory positions and one or more extents of input to the computer program;

mapping, using the one or more memory positions and the one or more extents, one or more inferred stack frames onto one or more concrete stack frames, the one or more inferred stack frames indicating positions of variables used in the computer program, wherein an inferred stack frame from among the one or more inferred stack frames comprises a heuristically reconstructed symbolic stack frame in the executing computer program;

identifying, based on mapping the one or more inferred stack frames onto the one or more concrete stack frames, at least one variable from among the variables used in the computer program that is within a stack overflow memory and within a dataflow path to the faulting instruction, wherein the dataflow path to the faulting instruction indicates the variables used in the computer program that are accessed by or contribute to the faulting instruction;

determining, in response to identifying the at least one variable that is within the stack overflow memory and within the dataflow path to the faulting instruction, that the stack overflow contributed to the crash of the computer program; and providing an output classifying severity, likelihood or manner of contribution of the stack overflow to the crash of the computer program.

16. The computer-readable medium of claim 15, wherein the one or more extents comprise a contiguous area of memory of the computer denoted by a starting address and an ending address.

17. The computer-readable medium of claim 16, wherein the one or more extents further comprise data stored in the contiguous area of memory.

18. The computer-readable medium of claim 15, wherein the one or more concrete stack frames comprise an extent in memory of the computer used for executing the computer program and storing a whole of a stack of the computer program.

19. The computer-readable medium of claim 15, wherein mapping the one or more inferred stack frames onto the one or more concrete stack frames comprises identifying, in the one or more concrete stack frames, memory positions and extents of variables named in the one or more inferred stack frames.

* * * * *

UNITED STATES PATENT AND TRADEMARK OFFICE
CERTIFICATE OF CORRECTION

| | |
|---|---|
| PATENT NO. | : 11,256,561 B1 |
| APPLICATION NO. | : 17/249532 |
| DATED | : February 22, 2022 |
| INVENTOR(S) | : Peter Kelly Keller and David John Musliner |

Page 1 of 1

It is certified that error appears in the above-identified patent and that said Letters Patent is hereby corrected as shown below:

In the Specification

In Column 1, after Line 2, and before Line 3, immediately after the title, please insert the following:
--STATEMENT REGARDING FEDERALLY
SPONSORED RESEARCH OR DEVELOPMENT
This invention was made with government support under Contract Number 70NANB18H169 awarded by National Institute of Standards and Technology (NIST). The government has certain rights in this invention.--

Signed and Sealed this
Third Day of June, 2025

Coke Morgan Stewart
*Acting Director of the United States Patent and Trademark Office*